United States Patent [19]

Risch

[11] Patent Number: 5,133,075

[45] Date of Patent: Jul. 21, 1992

[54] METHOD OF MONITORING CHANGES IN ATTRIBUTE VALUES OF OBJECT IN AN OBJECT-ORIENTED DATABASE

[75] Inventor: Tore J. M. Risch, Menlo Park, Calif.

[73] Assignee: Hewlett-Packard Company, Palo Alto, Calif.

[21] Appl. No.: 286,556

[22] Filed: Dec. 19, 1988

[51] Int. Cl.⁵ .................. G06F 7/20; G06F 11/30
[52] U.S. Cl. .................. 395/800; 395/600; 395/725; 364/DIG. 1; 364/DIG. 2; 364/282.1; 364/276; 364/261; 364/251.7; 364/974.5; 364/974
[58] Field of Search .......... 364/200 MS File, 401, 364/900 MS File; 395/800, 725, 600

[56] References Cited

U.S. PATENT DOCUMENTS

| | | | |
|---|---|---|---|
| 4,769,772 | 9/1988 | Dwyer | 364/200 |
| 4,805,099 | 2/1989 | Huber | 364/200 |
| 4,819,159 | 4/1989 | Shipley et al. | 364/200 |
| 4,864,497 | 9/1989 | Lowry et al. | 364/200 |
| 4,918,593 | 4/1990 | Huber | 364/200 |
| 4,937,743 | 6/1990 | Rassman et al. | 364/401 |
| 4,961,139 | 10/1990 | Hong et al. | 364/200 |
| 4,965,718 | 10/1990 | George et al. | 364/200 |

Primary Examiner—Thomas C. Lee
Assistant Examiner—Mehmet Geckil

[57] ABSTRACT

A method of monitoring objects in an interactive object-oriented database system. Any of a plurality of client programs can request monitoring of attributes of objects in the database. A record is kept of update transactions initiated by a client. When the client commits the changes, any client which has requested monitoring is notified of any change in the value of an attribute being monitored at the request of that client. The notification interrupts the client and invokes a predesignated client procedure. Overhead is minimized by creating partial view materialization paths and defining monitors ahead of time and by localizing the monitoring.

21 Claims, 7 Drawing Sheets

FIG_ 5

FIG_ 4

FIG_ 1

FIG. 2

FIG_ 3

FIG_ 6A

FIG_ 6B

FIG_ 7

METHOD OF MONITORING CHANGES IN ATTRIBUTE VALUES OF OBJECT IN AN OBJECT-ORIENTED DATABASE

BACKGROUND OF THE INVENTION

The present invention relates generally to database systems, and more particularly to a method of monitoring changes in values of attributes of objects in object-oriented database systems.

In an object-oriented database system, an "object" is a kind of entity. An object has certain "attributes", or characteristics, associated with it. A "view" of an object is a set of some of the attributes associated with that object. To "materialize" a certain view respecting a given object means to provide the values of those attributes which make up that view.

Some attributes have values which are stored in the database; these attributes are accessed by retrieving them from storage. An "extensional" function is a procedure which is used for retrieving such values from storage. Other attributes have values which are not stored but rather are derived (by computation or the like) as needed; an "intensional" function is a procedure which is used for deriving such values (and which has no undesired side effects).

For example, an employer might have a database system for keeping certain information about its employees. Each employee would be known to the database system as an "object" of type EMPLOYEE. The database might include values for each of the following attributes of an EMPLOYEE object:

NAME
DATE OF BIRTH
HOME ADDRESS
MONTHLY SALARY
HIRE DATE (In addition, the system gives each employee a unique identifier so that two employees having the same name can easily be distinguished.)

As already noted, some attributes can be derived from others. For example, every employee has an AGE, but if the system knows an employee's birthdate it can easily compute that employee's age. Therefore, to save space and to preserve system integrity only the value of the employee's birthdate is stored in the database; the employee's age is computed whenever it is needed.

An employee named Bill Johnson might be represented by the following attribute values in the database:

| NAME: | Bill Johnson |
|---|---|
| BIRTH DATE: | 4-5-60 |
| HOME ADDRESS: | 123 Main Street, Palo Alto, CA 94303 |
| MONTHLY SALARY: | $2,500.00 |
| HIRE DATE: | 11-20-85 |

One "view" of an employee might consist only of the employee's name and address. Such a view might be used, for example, to have the computer print an envelope in which a notice to employees would be mailed. To "materialize" this view for a given employee it would be necessary to call two extensional functions—"Name" and "Address"—which would return the values of the attributes NAME and ADDRESS of the designated employee.

Another view of an employee might consist of the employee's name, age, monthly salary and number of years with the company. This view might be used, for example, to calculate how much to credit to the employee's retirement account. To materialize this view it would be necessary to call two extensional functions—"Name" and "Monthly Salary"—and two intensional functions—"Age" and "Number of Years with Company." The two intensional functions would return the required values of the attributes AGE and NUMBER OF YEARS WITH COMPANY by performing computations on other values returned by extensional or other intensional functions and which ultimately are derived from values which are stored in the database.

A typical computer system includes a central processing unit, a main memory, storage media such as magnetic disks, a terminal which includes for example a keyboard and a monitor screen, and a plurality of workstations. Each workstation comprises a terminal and usually a local processing unit and memory as well. Users at the various workstations use the computer to perform a variety of tasks.

A "client" of a database system is an applications program which interacts with the database system. Such a client program may be executed by the central processor or by a local processing unit in a workstation. A user may be running a plurality of client programs simultaneously.

Occasions may arise when a client needs to be alerted if certain values in the database are changed. In the example of the employee database discussed above, at one workstation a client program might be updating the database with respect to various financial matters, including the amount to deposit in each employee's retirement account for the previous month, while at a different workstation (possibly hundreds of miles away) another client program might be updating the database by posting all the salary raises which were granted during that month. The first client program must be alerted if anything done by either program results in changes in the values of financial data respecting one of the employees on whose retirement account the first client is then working.

More generally, a notification that a monitored value has changed may be needed for any of a number of purposes. A client may wish to be alerted if an abnormal condition occurs. The occurrence of a certain condition or set of conditions may be a signal to start running a certain application program. A graphic display may need to be updated whenever there is a change in a parameter being displayed. A client may need to recompute certain other values which depend on the value which has just changed (as in the above example of the employee retirement account).

Monitoring imposes a heavy computational and input/output overhead on a database system, especially if the system is large and a number of values are being monitored at the same time for several different clients. Various methods have been proposed to minimize this overhead. For example, in one such system an "alerter" is called if specified boolean conditions are satisfied (O. P. Buneman and E. K. Clemons, "Efficiently Monitoring Relational Databases," *ACM Transactions on Database Systems* 4, 3, September 1979, pp 368-382). A "retrieve always" mechanism in another system causes queries to be re-executed upon each update to specified relations (M. Stonebraker, "Triggers and Inference in Database Systems," in M. Brodie and J. Mylopoulos (eds.), *On Knowledge Based Management Systems*, Springer-Verlag, 1986).

Systems of "triggers" have been proposed for relational database systems; such triggers typically invoke a database procedure upon updates of user-specified base relations (see, for example, M. Astrahan et al., "System R: A Relational Approach to Database Management," *ACM TRansactions on Database Systems*, 1 (2), June 1976).

A technique which is somewhat similar to the trigger system is the use of a "declarative integrity constraint," in which a proffered update to the database is rejected if specified boolean conditions are not satisfied at commit time (see, for example, M. Stonebraker, "Implementation of Integrity Constraints and Views by Query Modification," *Proc. ACM SIGMOD Conf.*, San Jose, Calif., May 1975).

Another technique, access-oriented programming, is implemented in some object-oriented languages such as "LOOPS". A message to set values of instance variables is intercepted by means of a user-provided trigger procedure which may in turn set or display some other value (M. J. Stefik et al., "Integrating Access-Oriented Programming Into a Multiparadigm Environment," *IEEE Software* 3, 10, January 1986, pp. 10-18). The trigger procedures are dynamically added and removed from running systems to avoid interfering with other system logic (K. Osterbye, "Active Objects: An Access Oriented Framework for Object-Oriented Languages," *Journal of Object-Oriented Programming*, Vol. 1, No. 2, June/July 1988, pp. 6-10).

Finally, expert systems such as "SYNTEL" and "OPS5" provide a method of monitoring virtual memory data retrieved from persistent data (R. Reboh and T. Risch, "Syntel: Knowledge Programming Using Functional Representations," *Proc. AAAI-86*, Philadelphia, Pa., August 1986, pub. Morgan Kaufman, Los Altos, Calif., 1986, pp. 1003-1007).

Each of these proposed methods offers certain benefits, primarily in the context of the particular environment for which it was designed. However, there remains a need for an efficient way to monitor objects in an object-oriented database system which interacts cooperatively with client programs.

SUMMARY OF THE INVENTION

The present invention provides a localized method of monitoring an object in an interactive, object-oriented database system in response to a request from a client program and invoking an application procedure designated by the client if a change in a monitored attribute value is detected. High-overhead tasks are performed at times when monitoring is not taking place so as to minimize any overhead imposed on the system during actual monitoring.

A preferred embodiment of a method of monitoring an object according to the invention includes the following steps: keeping a record of any client requests to monitor an attribute of the object; keeping a record of any update transactions initiated by a client during an update session; and if that client requests that the transaction be committed, determining which monitored attributes may have been affected, determining whether the values of any of said attributes have changed, and, for each value which has changed, notifying any client which requested monitoring of that attribute.

Notifying a client preferably comprises interrupting any task then being performed by the client and invoking a predesignated client procedure. If the client is not in an interruptible state, a record is kept of notifications intended for that client until the client enters an interruptible state or requests notification.

Monitor requests are preferably localized with respect to time, client, object and attribute to minimize the overhead imposed on the system during database updates.

Keeping the record of update transactions imposes very little overhead on the database system because the record is small and can be kept in main memory. The record can be cleared after determining whether the values of any attributes have changed. This determination may be made when updates are committed or any time a client requests notification of any changes. In the latter event, a record of the changes is preferably kept for later notification of other clients for which attributes are being monitored.

Certain high-overhead tasks can be performed before an update session is commenced. One such task consists of optimizing a partial view materialization path for each attribute of a view of an object. This task is preferably carried out during creation of the view itself. Later, if monitoring of the value of an attribute of that view is requested, the optimized path for that attribute is used, thereby imposing less overhead on the system than would be imposed if the entire view had to be materialized in order to monitor the value of that one attribute.

Another task which is preferably taken care of ahead of time is defining a monitor procedure for a given attribute. This task includes, for example, creating means for keeping the record of client requests for monitoring of that attribute and creating means for keeping a record of the value of the attribute being monitored.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

As shown in the drawings for purposes of illustration, the invention is embodied in a novel method of monitoring a database object and notifying a client program if a change is detected. Various methods of monitoring data in databases have been proposed, but there has been a need for an efficient way to monitor an attribute of an object in an interactive, object-oriented database system.

A method of monitoring a database object according to the invention includes keeping a record of any client request to monitor an attribute of the object, keeping a record of update transactions, and notifying the requesting client of any change in the value of the monitored attribute by invoking a predetermined client procedure when the update transactions are committed. The invention thus provides an efficient means for client programs to initiate monitor requests and receive notifications of changes in monitored attributes of database objects while imposing only minimal overhead on the database system.

In a preferred embodiment, a method of monitoring an object in a database in response to a request from any of a plurality of client programs comprises keeping a record of any client requests to monitor an attribute of the object; during a database update session, keeping a record of any database update transactions initiated by a client; and, if a client which has initiated an update transaction requests that the transaction be committed, determining which monitored attributes may have been affected by said transaction, determining whether the values of any of said attributes have changed, and for each value which has changed notifying any client which requested monitoring of that attribute.

Figure 1:
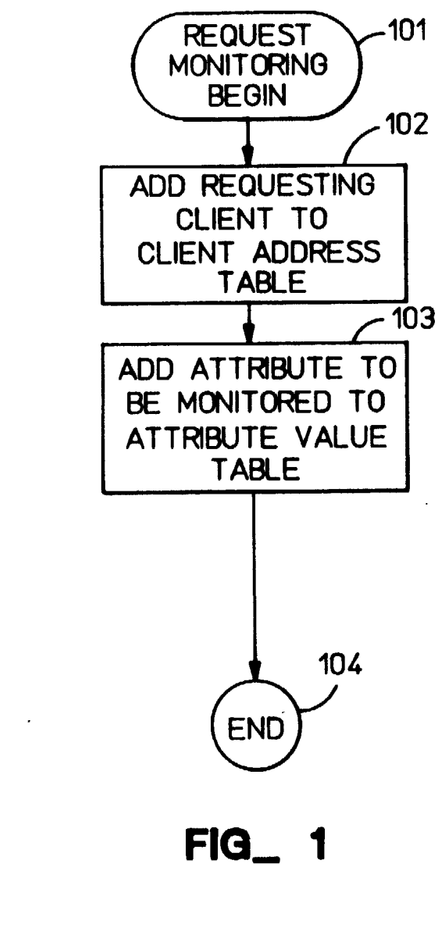
FIG. 1 is a flow chart illustrating a procedure for keeping a record of monitor requests according to the invention.

The record of client requests is preferably kept by means of a "Request Monitoring" procedure as illustrated in FIG. 1. The procedure is begun (block 101) by receipt of a request from a client to monitor a certain attribute. The request is entered in a "Client Address" table (block 102) and an "Attribute Value" table (block 103), and the procedure thereupon ends (block 104). The structure of these tables will be discussed in more detail in a subsequent paragraph.

Figure 2:
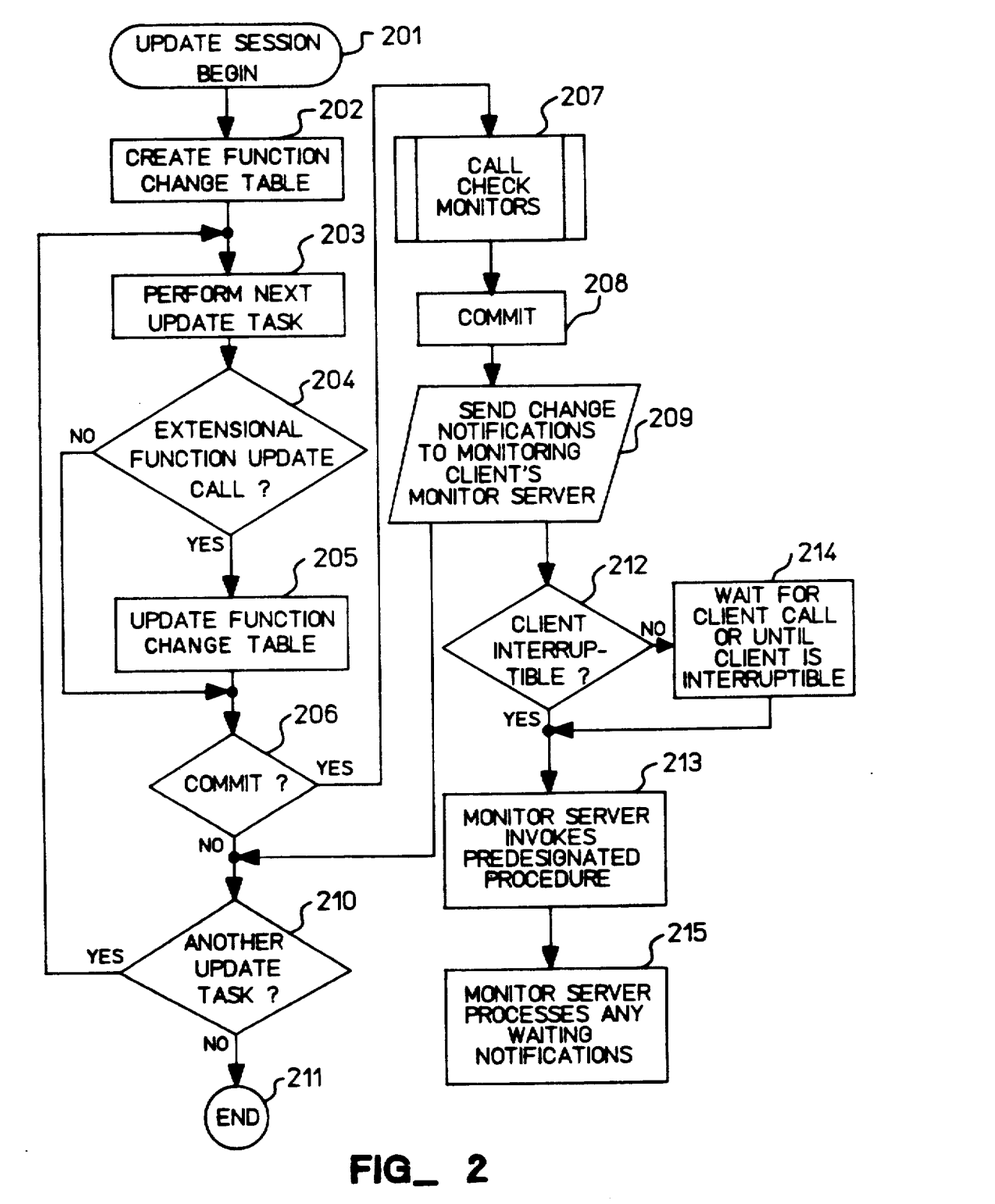
FIG. 2 is a flow chart illustrating a procedure for an update session according to the invention.

The record of database update transactions is preferably kept by creating and updating a "Function Change" table during an "Update Session" procedure as illustrated in FIG. 2. The procedure is begun (block 201) by a client initiating an update session. The system creates the Function Change table (block 202) and then proceeds with an update task as directed by the client (block 203). If the task included an extensional function update call (block 204), the function which was called is entered in the Function Change table (block 205); if not, no entry is made in the table. The client decides whether to commit any updates made thus far (block 206), and if the client requests that such updates be committed a "Check Monitors" procedure is called (block 207).

Figure 3:
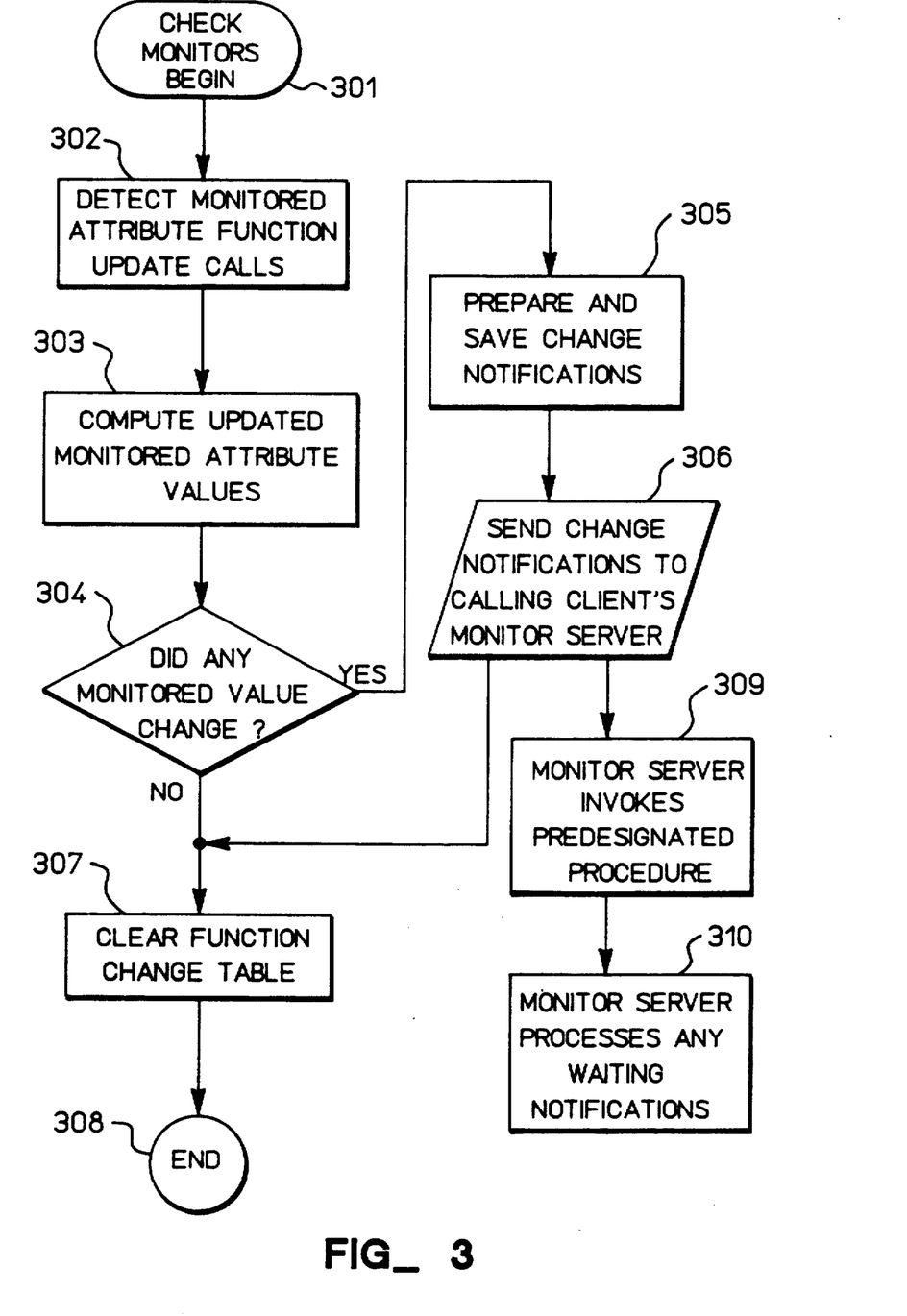
FIG. 3 is a flow chart illustrating a "Check Monitors" procedure which is called from the procedure shown in FIG. 2.

Determining which monitored attributes may have been affected and whether the values of any of those attributes have changed is preferably accomplished by means of the Check Monitors procedure as illustrated in FIG. 3. As described above, the procedure is initiated (block 301) by a procedure call generated during an update session (the procedure may also be called directly by a client as will be discussed in more detail in a subsequent paragraph). Any update function call which might have resulted in a change to a monitored attribute value is detected (block 302) by reference to the Function Change table and to a "Function Dependence" table (to be described hereafter). An updated value for each such attribute is computed (block 303). Whether there has been any change in such an attribute value is determined (block 304) by reference to the Attribute Value table. If a monitored attribute value has changed, a change notification is prepared and saved (block 305) and sent to the client which called the procedure (block 306); because the procedure was called by a commit request made by an update client, the update client is the one which receives the notification. The Function Change table is cleared (block 307) and the procedure ends (block 308).

Referring again to FIG. 2, after the Check Monitors procedure is concluded the updated data is committed to the database (block 208). ("Committing" means storing the updated data in the database and deleting any superseded data.) Then the saved change notification is sent to any other client which had requested monitoring of the changed attribute value (block 209). If there is another update task to perform (block 210), such task is performed (block 203) and the above-described steps are repeated. When there are no more update tasks to perform, the update session ends (block 211).

It will be noted that a loop is defined by blocks 203, 204, 205, 206 and 210. In the absence of a commit decision (block 206), each update task results in one pass through the loop. Except for updating the Function Change table, the loop imposes no overhead which would not be imposed in the absence of the monitor procedure. As already noted, the Function Change table is small and resides in main memory and therefore the requirement to update it imposes very little overhead; moreover, even this small amount of overhead is skipped (block 204) unless the update task being performed includes an extensional function update call. Thus, the overhead imposed during an update session is kept to a minimum.

Notifying a client preferably comprises interrupting any task then being performed by the client and invoking a predesignated client procedure, for example by sending the notification to a portion of the client program referred to as a "monitor server". If the client being notified is the one which called the Check Monitors procedure (usually this will be the client which requests that updates be committed), this is done when a change in the monitored attribute value is detected (block 309 of FIG. 3).

If the client being notified is not the client which called the Check Monitor procedure, a determination is made, for example by that client's monitor server, whether the client is in an interruptible state (block 212 of FIG. 2). If the client is in an interruptible state, the monitor server invokes the predesignated procedure (block 213). If the client is not in an interruptible state, the monitor server waits (block 214) and keeps a record of the notification either until the client enters an interruptible state at which time the monitor server interrupts the client or until the client requests notification.

When a client's monitor server interrupts a client, in addition to invoking the predesignated procedure the monitor server also processes any waiting notifications (block 215 in FIG. 2 and block 310 in FIG. 3).

Figure 4:
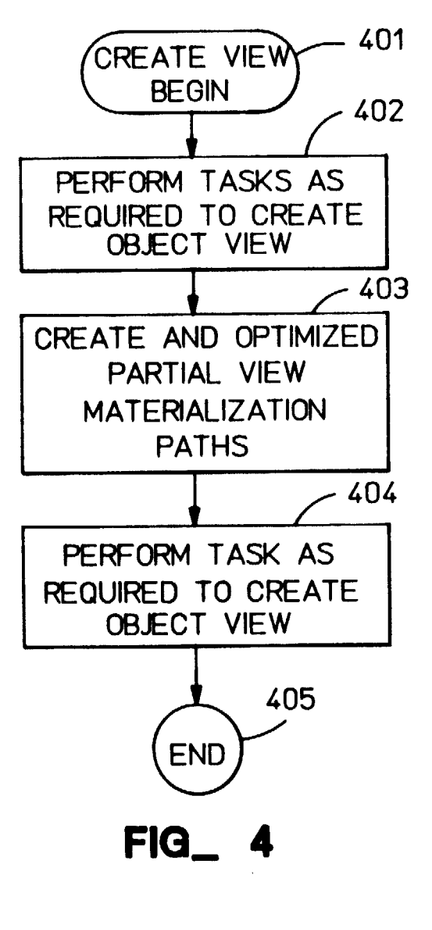
FIG. 4 is a flow chart illustrating a view creation procedure according to the invention.

Preferably, a partial view materialization path for a given attribute is created in advance of any request to monitor that attribute. This is done during a "Create View" procedure as depicted in FIG. 4. The Create View procedure is a relatively high-overhead task which is ordinarily performed during creation of the database or if necessary at other times, preferably when the system is not otherwise busy.

The Create View procedure is begun (block 401) by a user who instructs the system to create a view of an object. Various tasks are performed (block 402) by the system in creating such a view; the nature of these tasks is known to those skilled in the art and will not be further discussed herein. In addition to said tasks, the system creates and optimizes a partial view materialization path for each attribute of the view (block 403). After completing any other tasks associated with creating the view (block 404) the procedure ends (block 405).

The partial path for a given attribute constitutes a minimum number of steps needed to access only that one attribute without materializing the entire view. Later, if a request is made to monitor one of these attributes, this partial path is used to access the attribute. In the absence of such a path, it would be necessary to materialize the entire view just to access the one attribute being monitored, a step which would impose more overhead on the system than is imposed by using the partial path.

Figure 5:
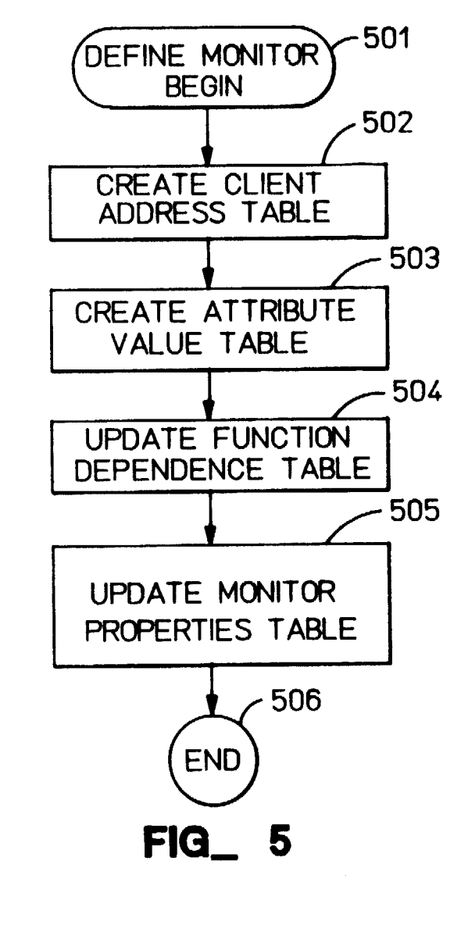
FIG. 5 is a flow chart illustrating a monitor definition procedure according to the invention.

Preferably a monitor is defined for a given attribute in advance of any request to monitor that attribute. This is done by means of a "Define Monitor" procedure as illustrated in FIG. 5. As was the Create View procedure, the Define Monitor procedure is a relatively high-overhead task which is preferably carried out when the system is not otherwise busy.

The Define Monitor procedure is begun (block 501) by a user who tells the system which attribute is to be monitored. As discussed above, every attribute is accessed by a function (either an extensional function or an intensional function), and the monitor procedure which is defined for a given attribute is defined in terms of the function which accesses that attribute (this function is hereafter referred to as "the monitored function").

The Define Monitor procedure preferably includes creating means for keeping the record of client requests. More particularly, a Client Address table is created (block 502) for the monitored function. This table includes positions for recording a client's identification, a client's address (for example, a workstation location) and a name of a procedure designated by the client.

Later, when a client requests monitoring of an attribute, the client's identification, address, and procedure designation are entered in the Client Address table for the function which accesses that attribute. The information in the table tells the system which client procedure to invoke upon detecting a change in the monitored attribute and where to send the notification that the procedure is to be invoked.

The Define Monitor procedure preferably includes creating means for keeping a record of the value of the attribute being monitored. More particularly, an Attribute Value table is created (block 503) for the monitored function. This table includes positions for recording the value of the attribute accessed by the function.

Later, when monitoring is begun, the then-current value of that attribute is calculated and entered in the table. Comparison of that value with the of the monitored attribute after an update tells the system whether the monitored value was in fact changed as a result of the update.

A single Function Dependence table is used to correlate extensional functions with intensional functions. As previously indicated, an intensional function accesses an attribute value by computation or the like based on other attribute values. A change in one of these other values may result in a change in the value accessed by that intensional function. Accordingly, if an attribute which is accessed by an intensional function is being monitored, any change in any of the values which are used in accessing the monitored attribute must be detected in order to determine whether the monitored value has changed. The Function Dependence table provides this correlation.

Accordingly, during monitor definition, if the function which accesses the attribute to be monitored is an intensional function, that function is listed in the Function Dependence table together with each extensional function which could change any of the values which are utilized by that intensional function in accessing the monitored attribute. Later, when Check Monitors is called, the extensional function update calls as listed in the Function Change table are compared with the listings in the Function Dependence table. In this way, the system detects update function calls which may have resulted in changes to monitored attributes (block 302).

Finally, the Define Monitor procedure preferably includes updating a "Monitor Properties" table (block 505). This table is a housekeeping table which tells the system where to find the Client Address and Attribute Value tables associated with each monitored function. After performing this step, the Define Monitor procedure ends (block 506).

The invention as described provides for notification to be sent to each client monitoring a given attribute when a client which is updating the data base decides to commit any changes. Some clients may need to check for changes at other times. Accordingly, any client which is monitoring an attribute may call the Check Monitors procedure at any time and receive notifications respecting changes to attributes being monitored by that client. It will be apparent that any such changes will be changes which have not yet been committed to the database; accordingly, notification of such changes is not sent to any client other than the one which called the Check Monitors procedure. However, a record of such changes is kept (block 305) for later notification of other clients and the Function Change table is cleared (block 307). If there are no further changes in the monitored value, then the notifications are sent to the other clients at commit time (as indicated by blocks 209 and 215 in FIG. 2 and 310 in FIG. 3). If there are further changes, then such changes will be detected at commit time and appropriate notifications will be sent. Thus, clients other than the client which invokes the Check Monitor procedure are assured that changed data have been committed to the database at the time the clients are notified of the changes.

Figure 6A:
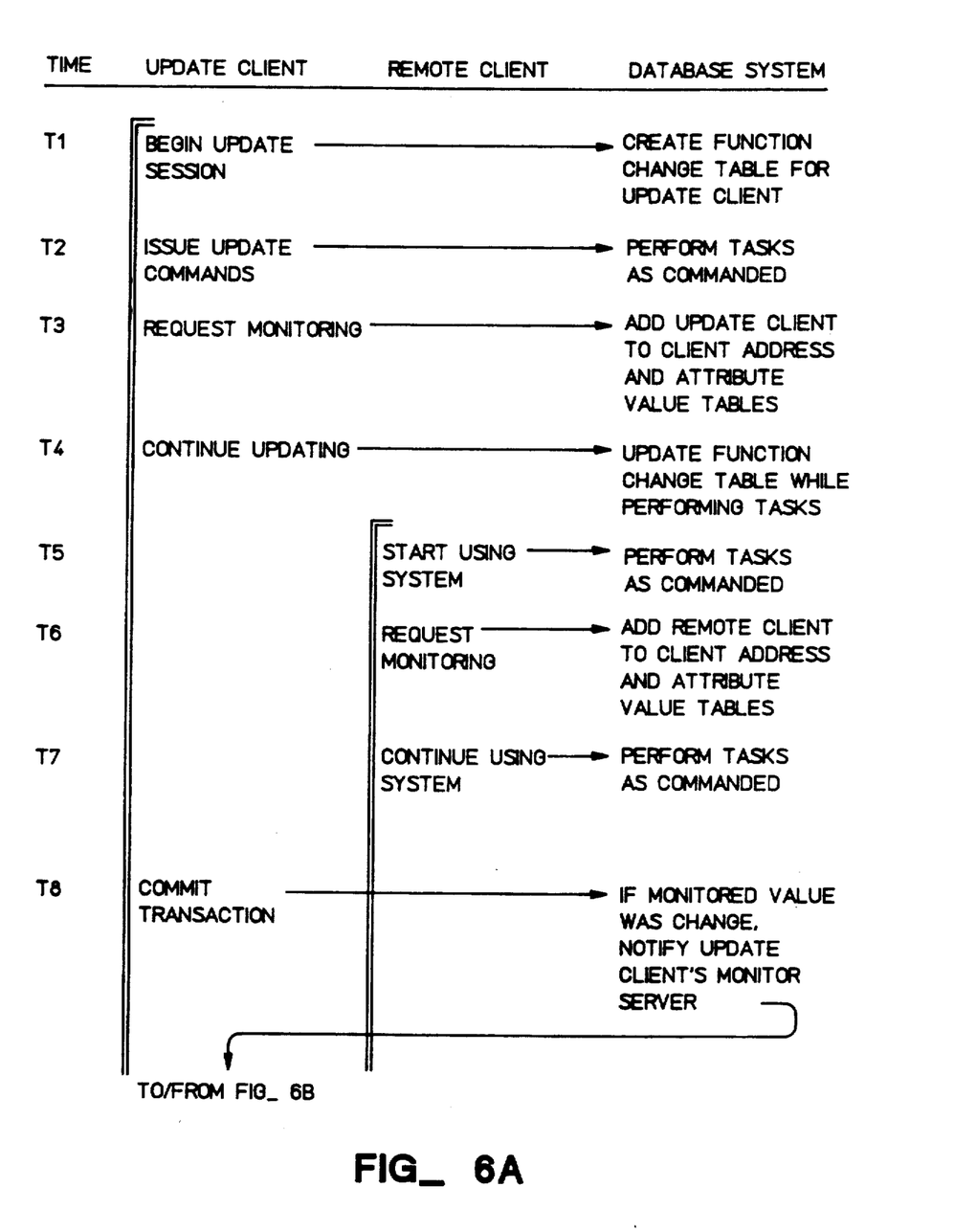
FIG. 6A and 6B are a time line chart of a database session including object monitoring according to the method of the invention.
Figure 6B:
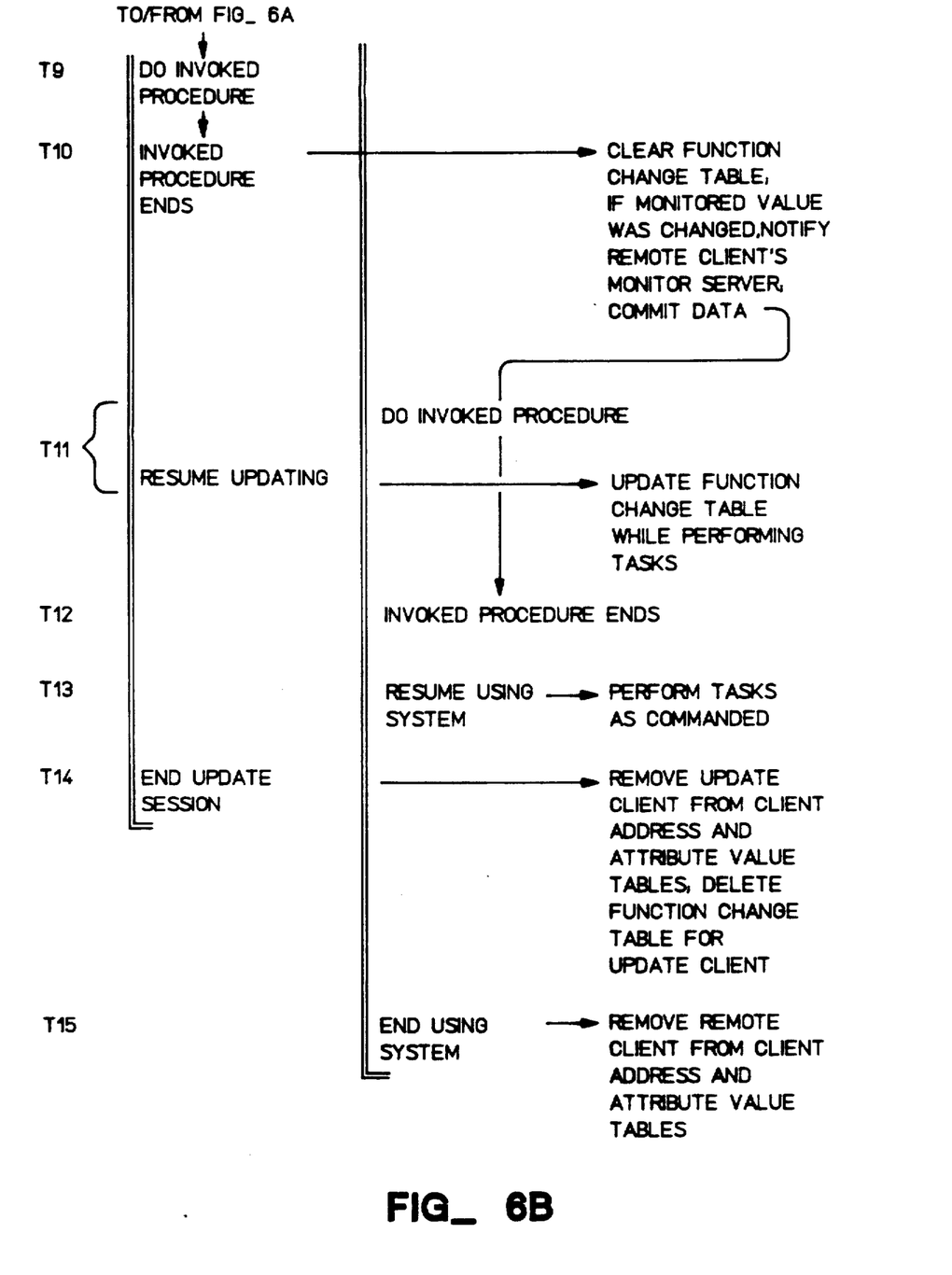

A typical sequence of events during a database update session which includes monitoring according to the invention is depicted in time chart form in FIGS. 6A and 6B. The term "update client" refers to a client program which initiates an update session; the term "remote client" refers to some other client which requests monitoring of an attribute during the time the update client is updating the database.

At time T1 the update client begins the update session. The database system creates a Function Change table to keep a record of any extensional function update calls initiated as a result of updates performed by the update client (see block 202 of FIG. 2).

At time T2 the update client begins issuing update commands and the system responds by performing tasks as commanded. At time T3, which may be the same as time T2 or any time thereafter, the update client requests that a certain attribute be monitored; the system adds the update client to the Client Address and Attribute Value tables (see the Request Monitoring procedure of FIG. 1). Thereafter, beginning at time T4 the update client continues updating and the system updates the Function Change table (see block 205 of FIG. 2) while it performs the tasks as commanded.

At time T5 the remote client begins using the system. If the remote client were to initiate an update session, another Function Change table would be created, but for purposes of the session depicted in FIGS. 6A and 6B it is assumed that the remote client is doing something else with the database system and therefore no Function Change table is created for that client. The system performs tasks as commanded by the remote client.

At time T6, which could be any time after T5, the remote client requests monitoring of the same attribute as the update client is monitoring; the system thereupon adds the remote client to the Client Address and Attribute Value tables. Thereafter (at time T7) the remote client continues using the system and the system performs tasks as commanded.

At time T8 the update client decides to commit whatever updates it has initiated. In response, the system checks for changes in monitored attribute values using the method of the invention as already described. If a change in the value of the attribute being monitored for the update client is detected, the update client's monitor server is notified. The monitor server interrupts the client (time T9) and invokes a procedure which the update client had designated earlier at time T3, when it first requested monitoring. The invoked procedure ends at time T10 and the system continues by clearing the Function Change table, notifying the remote client's monitor server, and committing the data.

The remote client is interrupted by its monitor server (time T11) and performs its predesignated procedure. Meanwhile, the update client resumes updating and the system again updates the Function Change table while performing tasks commanded by the update client. At time T12 the remote client finishes its procedure and at time T13 it too resumes using the system.

If there were another change in the value of the monitored attribute, the clients would again be interrupted. However, for purposes of the example it is assumed that there are no further changes and that the update client ends the update session at time T14. The system deletes the Function Change table for that client and removes the client from the Client Address and Attribute Value tables.

At time T15 the remote client ends its use of the system and it too is removed from the tables.

The example as depicted in FIGS. 6A and 6B is intended only to be illustrative of a relatively simple set of transactions. It will be apparent that a plurality of clients might be using the system at any given time and that various ones of the clients might update the database or request monitoring during various overlapping intervals of time. The various steps of the method as described and illustrated may occur many times during an update session as various monitor requests are received and various changed data are committed to the database.

Figure 7:
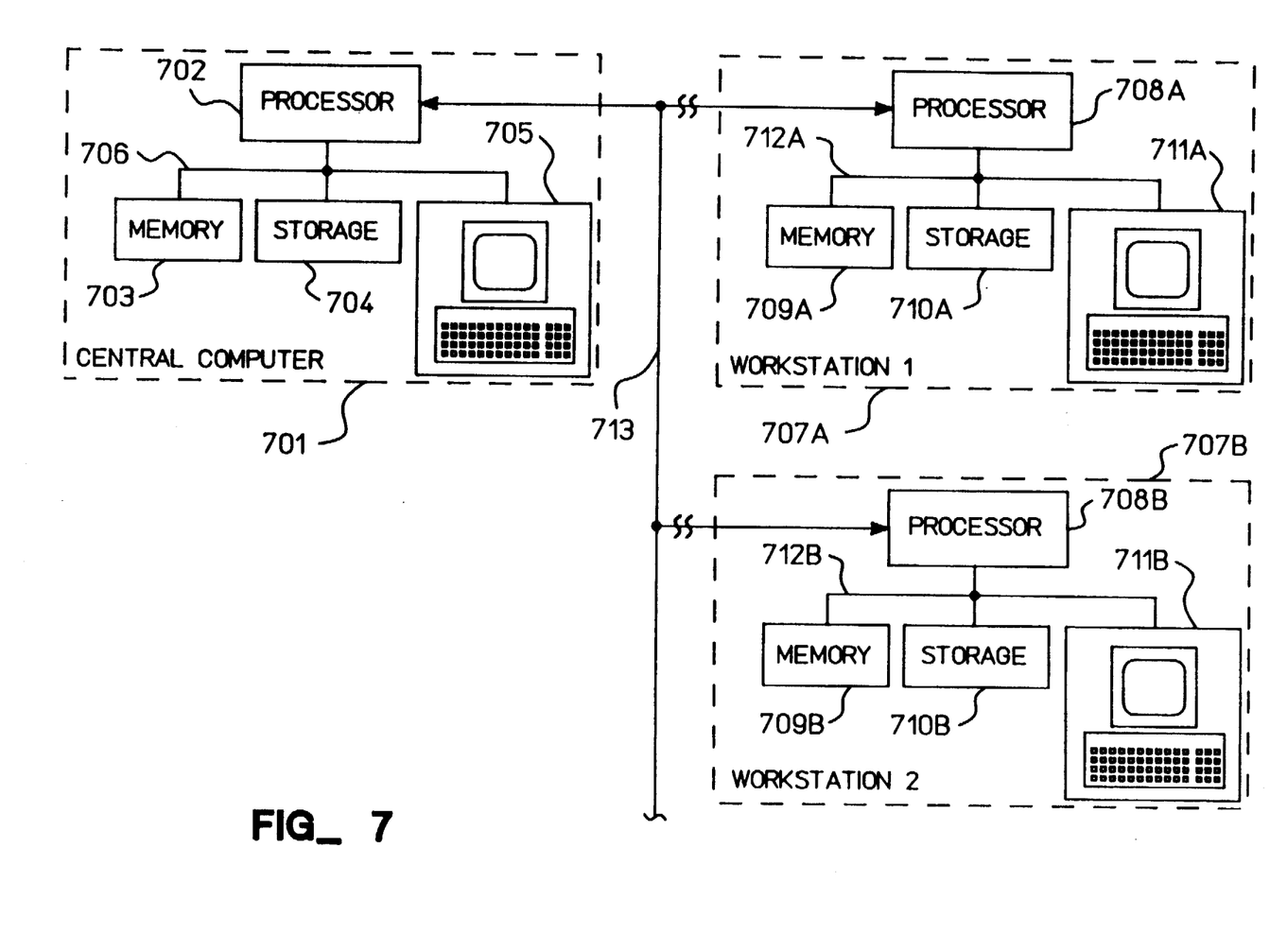
FIG. 7 is a block diagram of a computer system which includes an object-oriented database system including monitoring according to the invention.

An example of a computer system on which the method of the invention can be implemented is shown in FIG. 7. The system includes a central computer 701 having a central processor 702, a main memory 703, storage such as a magnetic disk drive 704, and a terminal 705, all interconnected by a bus 706. A plurality of workstations 707A and 707B, having respectively a local processor 708A and B, a memory 709A and B, storage 710A and B, and a terminal 711A and B, all interconnected by a bus 712A and B, are connected to the central computer 701 by a communications link 713. The communications link 713 may be a dedicated wire system, a telephone connection, a microwave system, or most any means by which the central computer 701 and the workstations 707A and B can communicate with each other.

Figure 8:
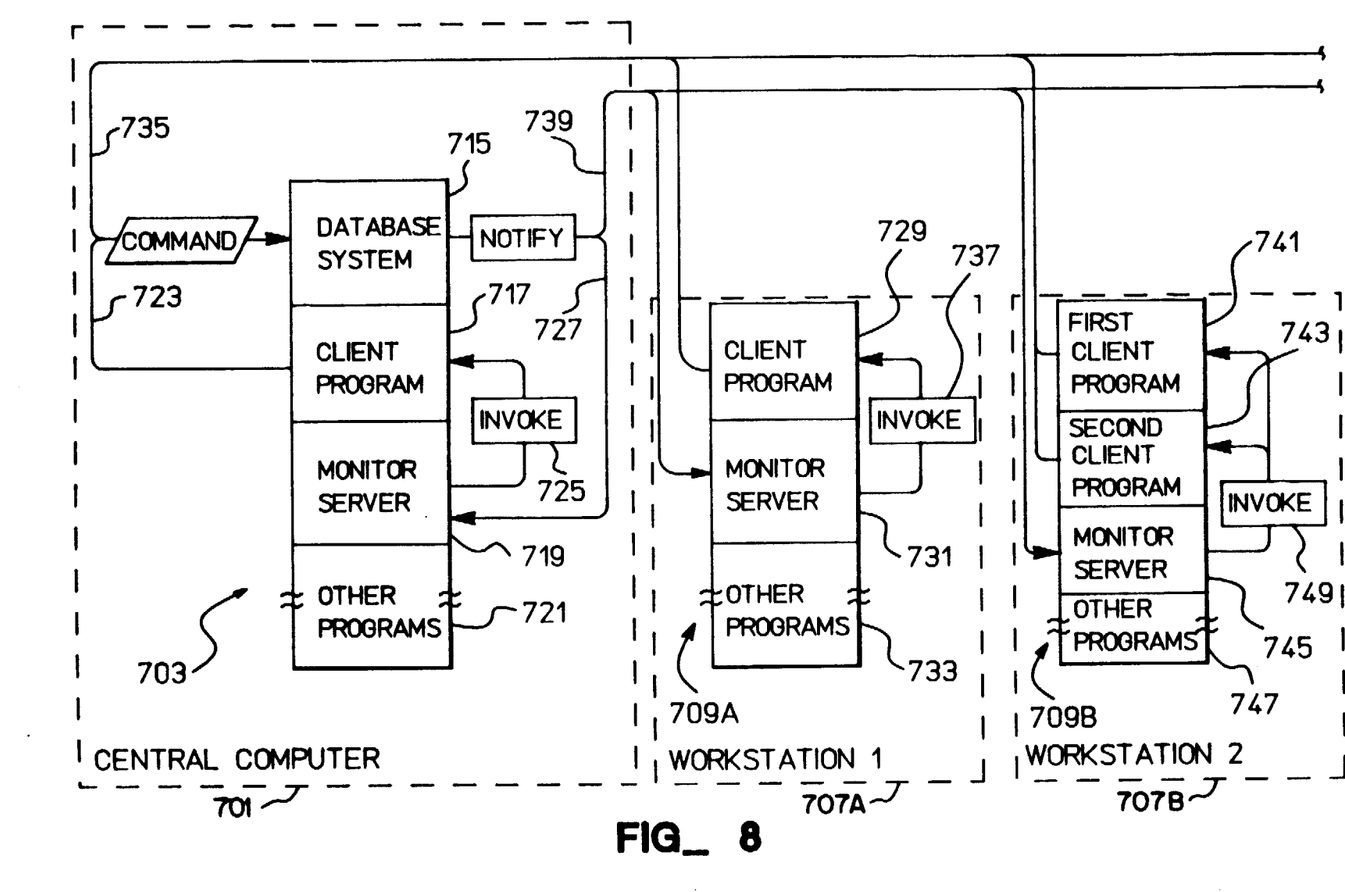
FIG. 8 is a block diagram of communication flow among portions of the system shown in FIG. 7.

An example of how communications might pass among client programs and the database system is shown in FIG. 8. For purposes of discussion all software and data are depicted as residing in main memory, but it will be apparent that in a real system some of the software and data are actually resident in mass storage and are called into main memory as needed. Also, certain communication channels are depicted as physical lines of communication but may actually exist in some other form such as instructions which pass information back and forth among different computer programs or parts of a program.

The memory 703 of the main computer 701 contains the database system (software and data) 715, a client program 717, a monitor server 719, and other programs 721. The client program 717 can issue commands to the database through a communication channel 723. The monitor server 719 can interrupt the client program and invoke a predesignated procedure through a communication channel 725. The monitor server 719 receives notifications from the database 715 through a communication channel 727.

The memory 709A of the workstation 707A contains a client program 729, a monitor server 731, and other programs 733. The client program 729 can issue commands to the database through a communication channel 735. The monitor server 731 can interrupt the client program and invoke a predesignated procedure through a communication channel 737. The monitor server 731 receives notifications from the database 715 through a communication channel 739.

The memory 709B of the workstation 707B contains two client programs 741 and 743, a monitor server 745, and other programs 747. The client programs 741 and 743 can issue commands to the database through the communication channel 735. The monitor server 745 can interrupt either or both of the client programs 741 and 743 and invoke predesignated procedures through a communication channel 749. The monitor server 745 receives notifications from the database 715 through the communication channel 739.

In the system as illustrated in FIGS. 7 and 8, one or more of the client programs may be running at any given time and, as discussed in connection with the time chart of FIGS. 6A and 6B, may issue commands to the database at various times. When monitored attribute values change the database issues notifications to whichever clients have requested notification of such changes, and the respective monitor servers thereupon interrupt their respective clients and invoke whichever procedures have been predesignated by those clients. Any given workstation, or the central computer, may have zero, one or many client programs active at any given time.

High efficiency is achieved by the method of the invention in part by minimizing system overhead as described and in part by localizing any monitoring which is being done. From the preceding discussion it will be apparent that the monitoring can be localized as to time, client, object and attribute as desired.

Thus, for example, a client program can start and stop a monitor so that monitoring does not take place except during a time when the client actually requires the monitoring. A procedure for stopping a monitor has been illustrated in FIG. 6 as being utilized when a client ends a session, but it will be apparent that such a procedure, which requires only that the client be deleted from the Client Address and Attribute Value tables, could be performed upon request of a client at any time even if the client continues to use the database system.

Localizing the monitoring as to client is inherent in the method of the invention in that monitoring only takes place when requested by a client. In addition, if a client becomes inactive without instructing the system to cease monitoring, monitoring can nevertheless be stopped, for example by periodic checks run by system to find out which clients are active and which have ceased to be active.

The monitoring can be localized as to object by monitoring only attributes of specified (focused) objects rather than monitoring all objects of a given type. Finally, as already discussed the monitoring is localized as to attribute by monitoring only desired attributes, not all attributes of a given object.

From the foregoing it will be apparent that the invention provides an efficient method of monitoring objects in an interactive object-oriented database system. Client programs participate actively in the monitoring by issuing monitor requests and by interacting with the database when notified that a monitored attribute value has changed. In this manner even a large number of client programs accessing a very large database can receive prompt, efficient service.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. In a computer database system, a method of monitoring an object in a database in response to a request from any of a plurality of client programs, the method comprising the following steps carried out by the system:

keeping a record of any request from a client to monitor an attribute of the object, the attribute depending on another attribute;

keeping a record indicating interdependence relationships among the attributes;

keeping a record of the value of each attribute being monitored by accessing said interdependence relationship record;

during a database update session, keeping a record of any database update transactions initiated by a client; and if a client which has initiated an update transaction request that said update transaction be stored in the database:

determining which monitored attributes may have been affected by said transaction;

determining whether the values of any of said attributes have changed by computing updated values form said attributes and comparing the updated values with the values in the attribute value record; and for each value which has changed, notifying any client which had requested monitoring of that attribute.

2. A method according to claim 1 wherein notifying a client comprises interrupting any task then being performed by the client and invoking a predesignated client procedure.

3. A method according to claim 1 wherein notifying a client comprises:

if the client is in an interruptible state, interrupting any task then being performed by the client and invoking a predesignated client procedure; and if the client is not in an interruptible state:

keeping a record of the notification until the client enters an interruptible state; and when the client enters an interruptible state, interrupting any task then being performed by the client and invoking a predesignated client procedure.

4. A method according to claim 1 wherein notifying a client comprises:

if the client is in an interruptible state, interrupting any task then being performed by the client and invoking a predesignated client procedure; and if the client is not in an interruptible state, keeping a record of the notification until the client requests notification and then invoking said predesignated client procedure.

5. A method according to claim 1 and further comprising optimizing a partial view materialization path for a given attribute in advance of any request to monitor that attribute.

6. A method according to claim 1 and further comprising defining a monitor procedure for a given attribute in advance of any request to monitor that attribute.

7. A method according to claim 6 wherein defining a monitor procedure comprises creating means for keeping the record of any request from a client.

8. A method according to claim 6 wherein defining a monitor procedure comprises creating means for keeping a record of the value of the attribute being monitored.

9. A method according to claim 1 and further comprising clearing the record of update transactions after determining whether any attribute values have changed.

10. In a computer database system, a method of monitoring an object in a database in response to a request from any of a plurality of client programs, the method comprising the following steps carried out by the system;

keeping a record of any request from a client to monitor an attribute of the object, the attribute depending on another attribute;

keeping a record indicating interdependence relationships among the attributes;

keeping a record of the value of each attribute being monitored by accessing said interdependence relationship record;

during a database update session, keeping a record of any database update transactions initiated by a client; and if a client request notification of any changes which have occurred in an attribute then being monitored for that client:

determining which monitored attributes may have been affected during said database update session;

determining whether the values of any of said attributes have changed by computing updated values for said attributes an comparing the updated values with the values in the attribute value record; and notifying the client which requested notification of each value which has changed.

11. A method according to claim 10 and further comprising keeping a record of the changes for later notification of any other clients for which attributes are then being monitored.

12. A method according to claim 10 wherein notifying the client which requested notification comprises interrupting any task then being performed by the client and invoking a predesignated client procedure.

13. A method according to claim 10 and further comprising optimizing a partial view materialization path for a given attribute in advance of any request to monitor that attribute.

14. A method according to claim 10 and further comprising defining a monitor procedure for a given attribute in advance of any request to monitor that attribute.

15. A method according to claim 14 wherein defining a monitor procedure comprises creating means for keeping the record of any request from a client.

16. A method according to claim 14 wherein defining a monitor procedure comprises creating means for keeping a record of the value of the attribute being monitored.

17. A method according to claim 10 and further comprising clearing the record of update transactions after determining whether any attribute values have changed.

18. In a computer database system, a method of monitoring an object in a database in response to a request from any of a plurality of client programs, the method comprising the following steps carried out by the system;

keeping a record of any request form a client to monitor an attribute of the object, the attribute depending on another attribute;

keeping a record indicating interdependence relationships among the attributes;

keeping a record of the value of each attribute being monitored by accessing said interdependence relationship record;

during a database update session, keeping a record of any database update transactions initiated by a client;

if a client which has initiated an update transaction request that said update transaction be stored in the database:

determining which monitored attributes may have been affected by said update transaction;

determining whether the values of any of said attributes have changed by computing updated values for said attributes and comparing the updated values with the values in the attribute value record; and for each value which has changed, notifying any client which requested monitoring of that attribute; and if a client request notification of any changes which have occurred in an attribute then being monitored for that client:

determining which monitored attributes may have been affected during said database update session;

determining whether the values of any of said attributes have changed by computing updated values for said attributes and comparing the updated values with the values in the attribute value record; and notifying the client which requested notification of each value which has changed.

19. A method according to claim 18 wherein the last step further comprises keeping a record of the changes for later notification of any other clients for which attributes are then being monitored.

20. A method according to claim 18 wherein notifying a client comprises interrupting any task then being performed by the client and invoking a predesignated client procedure.

21. A method according to claim 18 and further comprising clearing the record of update transactions after determining whether any attribute values have changed.

* * * * *